United States Patent
Okubayashi et al.

(10) Patent No.: US 10,218,296 B1
(45) Date of Patent: Feb. 26, 2019

(54) ROTOR POSITION SENSING SYSTEM FOR THREE PHASE MOTORS AND RELATED METHODS

(71) Applicant: SEMICONDUCTOR COMPONENTS INDUSTRIES, LLC, Phoenix, AZ (US)

(72) Inventors: Masanori Okubayashi, Ota (JP); Kazumasa Takai, Kakamigahara (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 4 days.

(21) Appl. No.: 15/689,062

(22) Filed: Aug. 29, 2017

(51) Int. Cl.
*H02P 6/18* (2016.01)
*H02P 21/13* (2006.01)
*H02P 21/18* (2016.01)
*H02P 21/32* (2016.01)

(52) U.S. Cl.
CPC .............. *H02P 6/183* (2013.01); *H02P 21/13* (2013.01); *H02P 21/18* (2016.02); *H02P 21/32* (2016.02)

(58) Field of Classification Search
CPC ........................................................ H02P 6/183
USPC ................................................... 318/727, 34
See application file for complete search history.

(56) References Cited

U.S. PATENT DOCUMENTS 9,625,172 B2 * 4/2017 Sasaki .................. F04D 27/00
2002/0113569 A1 8/2002 Iijima et al.
2004/0239285 A1 2/2004 Neuvonen
2010/0181952 A1 7/2010 Cheng
2012/0119687 A1 5/2012 Murai
2012/0181963 A1 7/2012 Wang
(Continued)

FOREIGN PATENT DOCUMENTS

JP   1994-113585   4/1994
JP   1995-177788   7/1995
(Continued)

OTHER PUBLICATIONS

Jeff Wilson, "Industrial Motor Control Part 2: Introduction to ACIM and PMSM Motor Control," published online at least as early as Jul. 2009 by NXP/Freescale, available online at https://www.nxp.com/files/training_pdf/VFTF09_AZ134.pdf, last visited Jun. 16, 2016.
(Continued)

*Primary Examiner* — David S Luo
(74) *Attorney, Agent, or Firm* — IPTechLaw

(57) ABSTRACT

Implementations of methods for sensing rotor positions of a motor may include coupling a controller with a PMSM and applying, using the controller, a plurality of vectors to the PMSM, the plurality of vectors including a plurality of dummy vectors and a plurality of measured vectors, wherein at least one measured vector is applied quadrature to a dummy vector from the plurality of dummy vectors immediately preceding each measured vector. The method may also include measuring, with a measurement circuit, a plurality of values from a three-phase inverter coupled with the PMSM, each value of the plurality of values corresponding with one of the plurality of measured vectors, and calculating, with one or more logic elements coupled with the PMSM, based on the plurality of values and using one or more position algorithms, a position of a rotor of the PMSM relative to a stator of the PMSM.

20 Claims, 13 Drawing Sheets

(56) References Cited

U.S. PATENT DOCUMENTS

| | | |
|---|---|---|
| 2013/0314009 A1 | 11/2013 | Sanchez et al. |
| 2014/0225548 A1 | 8/2014 | Xu et al. |
| 2014/0232311 A1 | 8/2014 | Hill |

FOREIGN PATENT DOCUMENTS

| | | |
|---|---|---|
| JP | 2004-040943 | 2/2004 |
| JP | 2007-014074 | 1/2007 |
| JP | 2007-174721 A | 7/2007 |
| JP | 2008-295113 A | 12/2008 |
| JP | 2009-071926 | 4/2009 |
| JP | 2010-220416 | 9/2010 |
| JP | 2013-172511 | 9/2013 |
| JP | 2014-110675 | 6/2014 |
| JP | 2014-113054 | 6/2014 |

OTHER PUBLICATIONS

NXP/Freescale, "PMSM Vector Control with Single-Shunt Current-Sensing Using MC56F8013/23 Design Reference Manual," published online at least as early as Apr. 2008 by NXP/Freescale, available online at http://cache.nxp.com/files/microcontrollers/doc/ref_manual/DRM102.pdf, last visited Jun. 16, 2016.

Shigeo Morimoto, Keisuke Kawamoto, Masayuki Sanada, Yoji Takeda, "Sensorless Control Strategy for Salient-Pole PMSM Based on Extended EMF in Rotating Reference Frame," IEEE Transactions on Industry Applications, vol. 38, No. 4, Jul./Aug. 2002, p. 1054-1061, available online at http://www.masters.dgtu.donetsk.ua/2014/etf/izvekov/library/article9.pdf, last visited Jun. 16, 2016.

NXP/Freescale, "Sensorless PMSM Field-Oriented Control," published online at least as early as Jun. 22, 2016 by NXP/Freescale, available online at http://cache.nxp.com/files/microcontrollers/doc/ref_manual/DRM148.pdf, last visited Jun. 22, 2016.

NXP/Freescale, "Three-Phase PMSM Sensorless FOC using MC56F82748 and MC56F84789 with Automated Motor Parameter Identification," published online by NXP/Freescale at least as early as Jun. 22, 2016, available online at http://cache.nxp.com/files/dsp/doc/app_note/AN5014.pdf, last visited Jun. 22, 2016.

NXP/Freescale, "3-Phase Sensorless BLDC Motor Control Using MC9S08MP16," published online by NXP/Freescale at least as early as Jun. 22, 2016, available online at http://cache.nxp.com/files/microcontrollers/doc/ref_manual/DRM117.pdf, last visited Jun. 22, 2016.

NXP/Freescale, "PMSM and BLDC Sensorless Motor Control using the 56F8013 Device," published online by NXP/Freescale at least as early as Jun. 22, 2016, available online at http://cache.nxp.com/files/dsp/doc/ref_manual/DRM077.pdf, last visited Jun. 22, 2016.

* cited by examiner

ROTOR POSITION SENSING SYSTEM FOR THREE PHASE MOTORS AND RELATED METHODS

BACKGROUND

1. Technical Field

Aspects of this document relate generally to three-phase motors. Specific implementations involve permanent magnet synchronous motors (PMSMs). More specific implementations involve methods used to detect the rotor position of a PMSM.

2. Background

Three-phase power systems use three conductors each carrying alternating current. The currents have the same frequencies and amplitudes but are each one-third out of phase relative to the other two. The phase difference results in a voltage peak on each conductor one third of a cycle after the voltage peak on another conductor (and so on), which effect may be used to product a rotating magnetic field in a motor. Permanent magnet synchronous motors (PMSMs) exist which utilize such a rotating magnetic field, including surface PMSMs (SPMSMs) and interior/internal PMSMs (IPMSMs).

SUMMARY

Implementations of methods for sensing rotor positions of a motor may include coupling a controller with a three phase permanent magnet synchronous motor (PMSM) and applying, using the controller, a plurality of current vectors to the PMSM, the plurality of current vectors including a plurality of dummy current vectors and a plurality of measured current vectors, wherein at least one measured current vector is applied quadrature to a dummy current vector from the plurality of dummy current vectors immediately preceding each measured current vector. The method may also include measuring, with a measurement circuit, a plurality of values from a three-phase inverter coupled with the PMSM, each value of the plurality of values corresponding with one of the plurality of measured current vectors, and calculating, with one or more logic elements coupled with the PMSM, based on the plurality of values and using one or more position algorithms, a position of a rotor of the PMSM relative to a stator of the PMSM.

Implementations of methods for sensing rotor positions of a motor may include one, all, or any of the following:

The PMSM may be one of a star configuration PMSM and a delta configuration PMSM.

The PMSM may include one of a surface permanent magnet synchronous motor (SPMSM) and an interior permanent magnet synchronous motor (IPMSM).

The plurality of measured current vectors may include six different current vectors.

The plurality of dummy current vectors may include six dummy vectors.

The plurality of measured current vectors may include twelve different current vectors.

The plurality of dummy current vectors may include three dummy vectors.

The one or more position algorithms may include one of $$\tan^{-1}\left(\frac{\sum_{i=1}^{N} -\sin(2\alpha_i) y_i}{\sum_{i=1}^{N} -\cos(2\alpha_i) y_i}\right)$$

and $$\tan^{-1}\left(\frac{\sum_{i=1}^{N} \sin(2\alpha_i) y_i}{\sum_{i=1}^{N} \cos(2\alpha_i) y_i}\right)$$

wherein each $\alpha_i$ includes a value between 0 and $2\pi$ and wherein each $y_i$ includes one of the measured values.

Implementations of methods for sensing rotor positions of a motor may include coupling a controller and one of a timer and an analog-to-digital converter (ADC) with a three phase permanent magnet synchronous motor (PMSM) and applying, using the controller, a plurality of current vectors to the PMSM, the plurality of current vectors including a plurality of dummy current vectors and a plurality of measured current vectors, wherein at least one measured current vector is applied quadrature to a dummy current vector from the plurality of dummy current vectors immediately preceding each measured current vector. The method may also include measuring, with the one of the timer and the ADC, a plurality of values from a three-phase inverter coupled with the PMSM, each value of the plurality of values corresponding with one of the plurality of measured current vectors and including one of a current value corresponding with an inductance of the PMSM and a time value corresponding with an inductance of the PMSM, and calculating, with one or more logic elements coupled with the PMSM, based on the plurality of values and using one or more position algorithms, a position of a rotor of the PMSM relative to a stator of the PMSM. The one or more logic elements may be configured to calculate the position of the rotor when the rotor is in a stopped configuration and when the rotor is in a rotating configuration, and the one or more logic elements may be configured to calculate a position of a rotor of a PMSM that is not controlled using vector control.

Implementations of methods for sensing rotor positions of a motor may include one, all, or any of the following:

The one or more position algorithms may include one of $$\tan^{-1}\left(\frac{\sum_{i=1}^{N} -\sin(2\alpha_i) y_i}{\sum_{i=1}^{N} -\cos(2\alpha_i) y_i}\right)$$

and $$\tan^{-1}\left(\frac{\sum_{i=1}^{N} \sin(2\alpha_i) y_i}{\sum_{i=1}^{N} \cos(2\alpha_i) y_i}\right)$$

wherein each $\alpha_i$ includes a value between 0 and $2\pi$ and wherein each $y_i$ includes one of the measured values.

The plurality of values may be measured using one or more elements coupled with one or more shunt resistors that are coupled with the three-phase inverter.

The method may further include coupling the timer with the PMSM and toggling the timer between a start configuration and a stop configuration using a signal processor in response to an input from a comparator.

The method may include coupling the ADC with the PMSM, converting an analog signal from the three-phase inverter to a digital signal using the ADC, and communicating the digital signal from the ADC to the one or more logic elements.

The plurality of dummy vectors may include one of six dummy vectors and three dummy vectors.

Implementations of methods for sensing rotor positions of a motor may include coupling a controller with a three phase permanent magnet synchronous motor (PMSM) and applying, using the controller, a plurality of current vectors to the PMSM, the plurality of current vectors including at least three dummy current vectors and at least six measured current vectors, wherein each dummy current vector is applied quadrature to a measured current vector immediately before each measured current vector is applied. The method may also include measuring, with a measurement circuit, a plurality of values from a three-phase inverter coupled with the PMSM, each value of the plurality of values corresponding with one of the plurality of measured current vectors, and calculating, with one or more logic elements coupled with the PMSM, based on the plurality of values and using one or more position algorithms, a position of a rotor of the PMSM relative to a stator of the PMSM.

Implementations of methods for sensing rotor positions of a motor may include one, all, or any of the following:

The method may include coupling one or more shunt resistors with the logic elements and the three-phase inverter.

The one or more logic elements may be configured to calculate a position of a rotor of a PMSM that is controlled using vector control.

The one or more position algorithms may include one of $$\tan^{-1}\left(\frac{\sum_{i=1}^{N}-\sin(2\alpha_i)y_i}{\sum_{i=1}^{N}-\cos(2\alpha_i)y_i}\right)$$

and $$\tan^{-1}\left(\frac{\sum_{i=1}^{N}\sin(2\alpha_i)y_i}{\sum_{i=1}^{N}\cos(2\alpha_i)y_i}\right)$$

wherein each $\alpha_i$ includes a value between 0 and $2\pi$ and wherein each $y_i$ includes one of the measured values.

The PMSM may be one of a SPMSM and an IPMSM.

The plurality of dummy vectors may include one of six dummy vectors and three dummy vectors.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended system and methods for detecting rotor position of a permanent magnetic synchronous motor (PMSM) will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such systems and methods for detecting rotor position of a PMSM, and implementing components and methods, consistent with the intended operation and methods.

In various implementations, elements of the system and methods used to detect rotor position of a PMSM disclosed herein may be similar to or include any of the elements of the systems and methods disclosed in U.S. patent application Ser. No. 15/215,425 to Takai, entitled "Rotor Position Sensing System For Three Phase Motors And Related Methods," filed on Jul. 20, 2016; U.S. patent application Ser. No. 15/219,021 to Takai, entitled "Rotor Position Sensing System for Three Phase Motors and Related Methods," filed on Jul. 25, 2016; and U.S. patent application Ser. No. 15/382,160 to Okubayashi, entitled "Rotor Position Sensing System for Permanent Magnet Synchronous Motors and Related Methods," filed on Dec. 16, 2016; the disclosures of each of which are hereby incorporated entirely herein by reference.

As explained in these previously filed applications, rotor position of a PMSM can be determined by applying a plurality of voltage vectors to a PMSM. A PMSM, as used in this disclosure, may indicate a surface PMSM (SPMSM), an interior PMSM (IPSM), a star configuration PMSM, and/or a delta configuration PMSM. A plurality of measurements are acquired corresponding with the voltage vectors that were applied to the PMSM. Based on the measurements, the rotor position of a PMSM may be determined.

Figure 1:
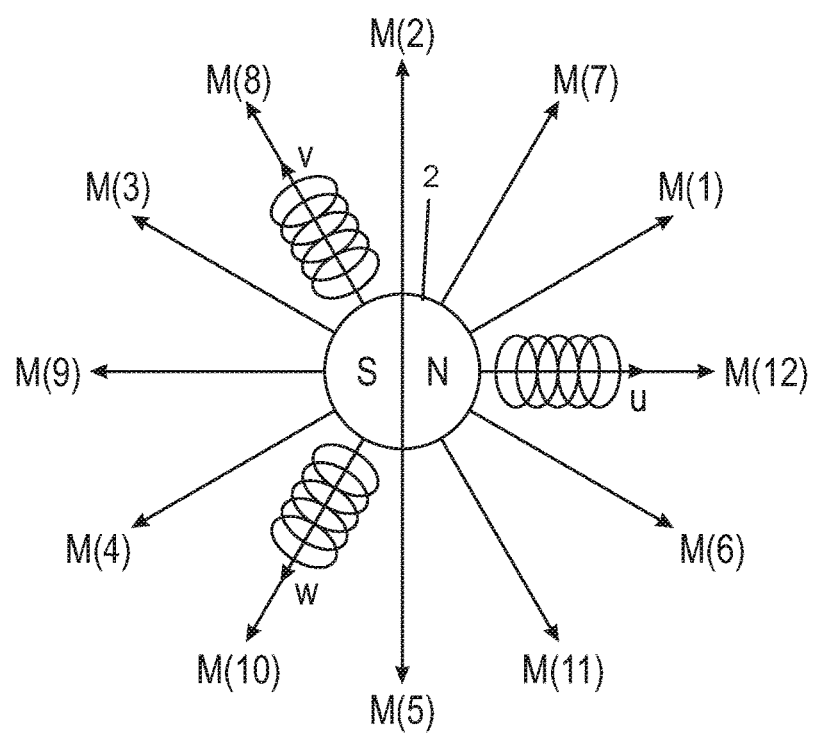
FIG. 1 is a representation of the relation between possible measurement vectors and the rotor position of a permanent magnetic synchronous motor (PMSM)

Referring to FIG. 1, a representation of the relation between possible measurement vectors and the rotor position of a PMSM is illustrated. A magnetic rotor 2 has a north pole and a south pole. In the implementation illustrated by FIG. 1, twelve different measurement vectors, or current vectors M(1)-M(12) are mapped against the three phase PMSM, with current vector M(12) corresponding to the north pole of magnetic rotor 2. Due to the relationship between voltage and current, the measurement vectors may be either current vectors or voltage vectors. One of ordinary skill in the art would understand the relationship between current and voltage and would understand how to replace current vectors with voltage vectors in the implementations disclosed herein using the principles disclosed herein.

Figure 2:
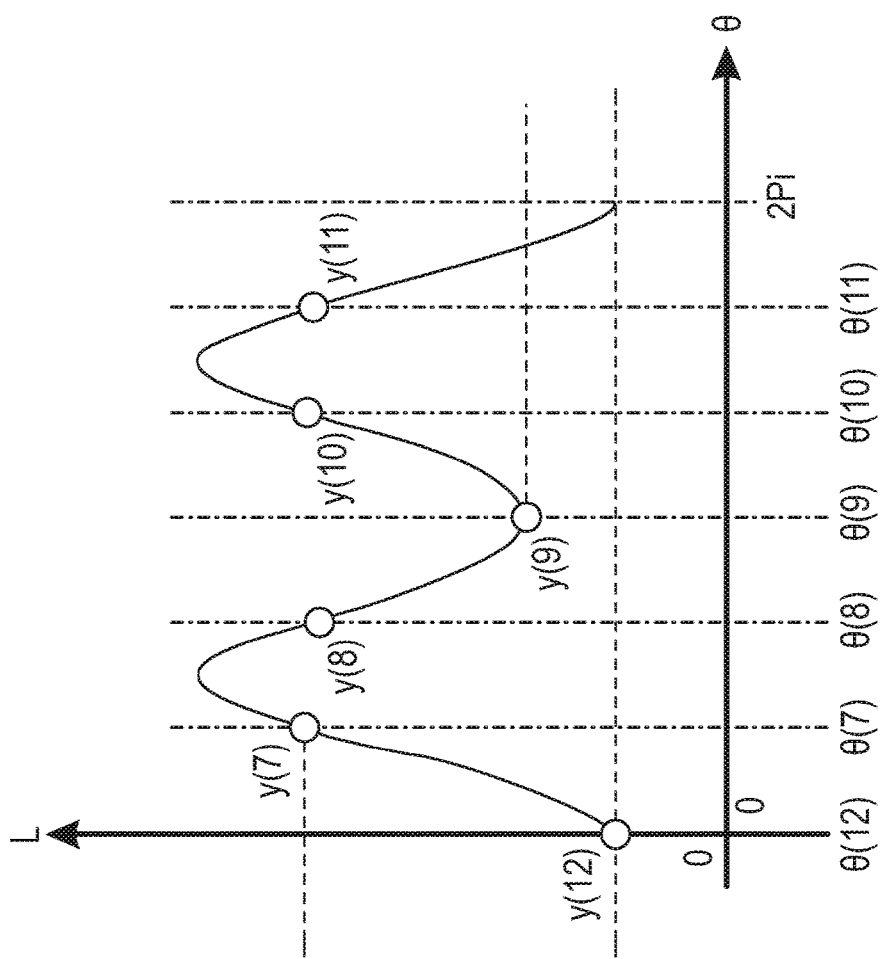
FIG. 2 is a chart with measured data resulting from the measurement vectors of FIG. 1.

Referring to FIG. 2, a chart with measured data resulting from the measurement vectors of FIG. 1 is shown. The chart in FIG. 2 charts the relation of the inductance L and the electrical angle θ of the current vectors M(1)-M(12) of FIG. 1. Data points y(7)-y(12) respectively correspond to vectors M(7)-M(12). As shown in FIG. 2, the current vector most closely aligned with the north pole (M12) corresponds to the data point with the lowest inductance y(12). Similarly, the current vector most closely aligned with the south pole M(9) corresponds to the data point with the second lowest inductance y(9). While the inductances corresponding with M(12) and M(9) might be similar, the vector most closely aligned with the north pole corresponds to the data point with the lowest inductance. The margin between the inductance of the vector corresponding to the north pole and the vector corresponding to the south pole may be calculated using Eq. 1:

$$NS\_Margin = (y(12) - y(9))/(y(7) - y(12)) \qquad \text{Eq. 1}$$

where y(7) is the biggest data point in FIG. 2, y(12) is the smallest data point in FIG. 2, and y(9) is the data point 180 degrees out of phase to the smallest data point y(12) in FIG. 2. As can be understood by FIG. 2 and Eq. 1, the smaller the NS_Margin, the more likely it is to mistake the vector corresponding to the south pole of the rotor with the vector corresponding to the north pole of the rotor.

Figure 3:
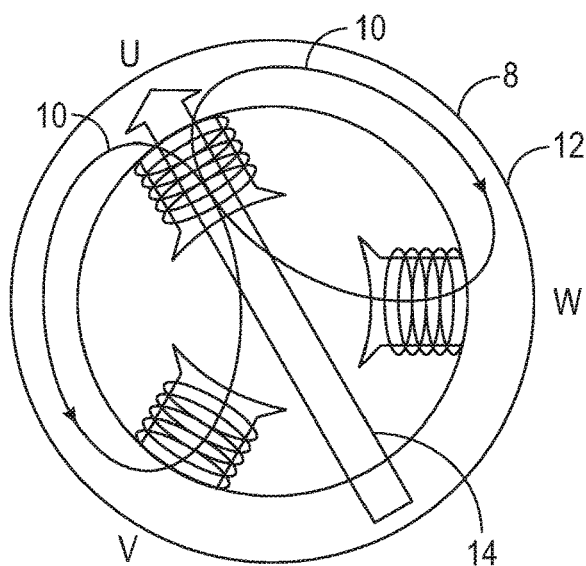
FIG. 3 is a representation of the generation of residual magnetic flux in a stator core of a three phase PMSM.
Figure 4:
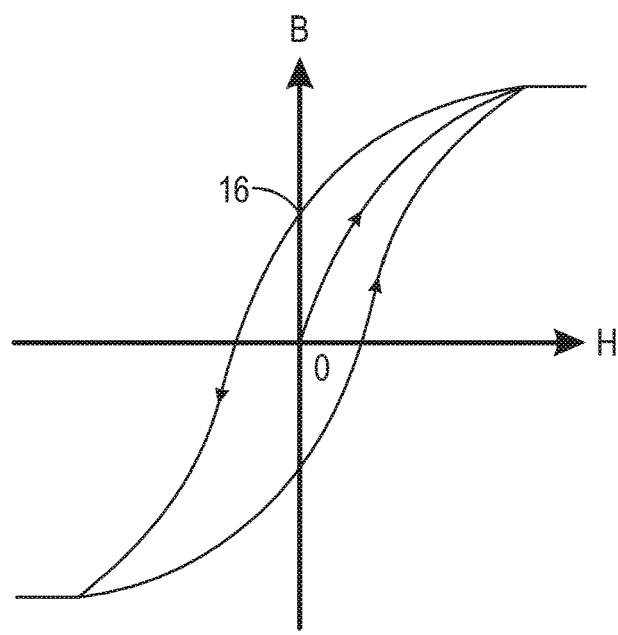
FIG. 4 is a representation of a hysteresis loop formed by residual magnetic flux.

The likelihood of mistaking the vector corresponding to the south pole of the rotor with the vector corresponding to the north pole of the rotor (or data point y(9) having a lower inductance than data point y(12)) is exacerbated with interfering magnetic flux. Referring to FIG. 3, a representation of the generation of residual magnetic flux in a stator core of a three phase PMSM is illustrated. When a current flows in a stator 8, residual magnetic flux 10 is generated in the stator core 12. A vector 14 associated with the residual magnetic flux 10 exists which is different from the vector of the current originally applied to the stator 8. The generation of residual magnetic flux forms a hysteresis loop, as illustrated by FIG. 4. The magnetic flux density is represented by vertical axis B with a magnetizing force represented by horizontal axis H. After a magnetizing force has been applied and is then reduced back to zero, there remains a residual magnetic flux density 16. This residual magnetic flux density can result in incorrect measured inductance data that may also vary temporally depending on the time inductance measurements are taken.

Figure 5:
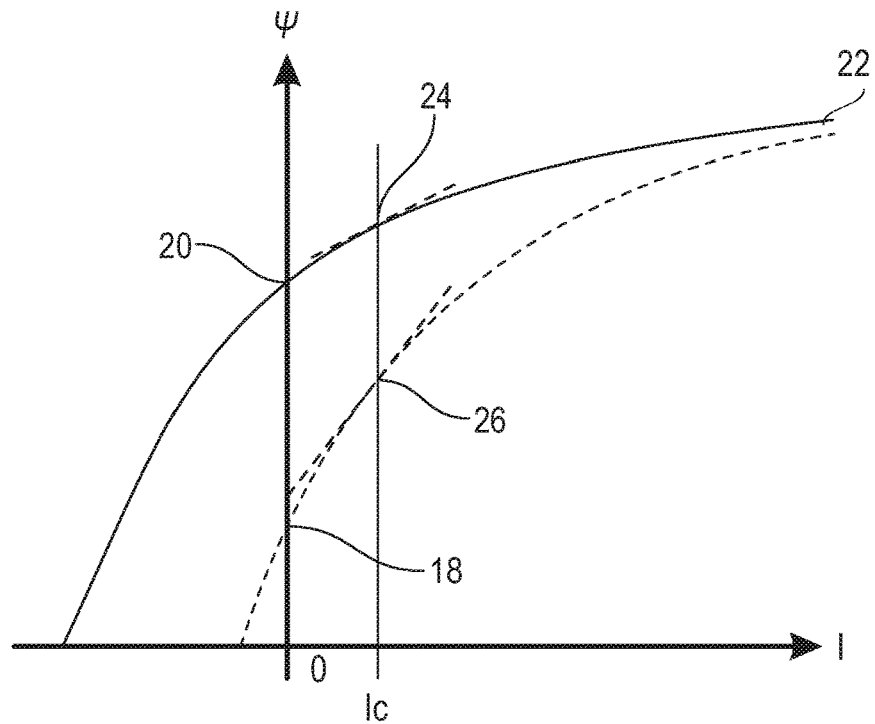
FIG. 5 is a chart illustrating measured inductance data of a rotor with and without residual magnetic flux.

Similar to the hysteresis loop of FIG. 4, FIG. 5, is a chart illustrating measured inductance data of a rotor with and without residual magnetic flux. In this illustration, the w axis represents magnetic flux and the I axis represents stator current. The chart illustrates rotor magnetic flux 18 alone and rotor magnetic flux combined with residual magnetic flux 20. As the two curves approach a saturation point 22, there is little difference between the magnetic flux of the rotor 18 and the magnetic flux of the rotor combined with any residual magnetic flux 20. However, the total amount of magnetic flux can vary significantly depending upon the stator current. In this illustration, $I_C$ represents a specific vector current. The total magnetic flux 24 at $I_c$ is noticeably more than just the magnetic flux 26 of the rotor at $I_c$. Because inductance L is a function of magnetic flux and current, the inductance $L_c$ of a rotor alone varies from the inductance $L_r$ of a rotor influenced by residual magnetic flux. This variation can be illustrated by Eqs. 2-4:

$$L_c = \frac{\Delta \psi_c}{\Delta I_c} \qquad \text{Eq. 2}$$

$$L_r = \frac{\Delta \psi_r}{\Delta I_c} \qquad \text{Eq. 3}$$

$$L_c \neq L_r \qquad \text{Eq. 4}$$

Figure 6:
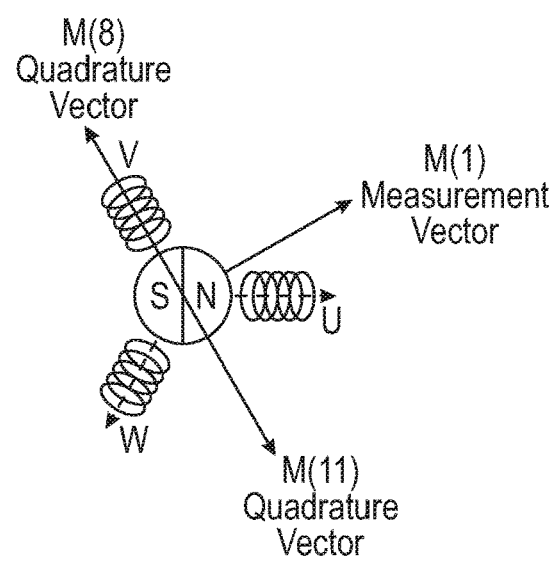
FIG. 6 is a representation of the relationship between a first current vector and two quadrature current vectors and the rotor position of a PMSM.

In various implementations, if a first current vector is applied just prior to applying a second current vector which will be measured and is quadrature to the first current vector, the effect of the residual magnetic flux felt by the second current vector can become virtually zero with regards to the effect the residual magnetic flux has on measurements of the second current vector. Referring to FIG. 6, a representation of the relationship between a first current vector and two quadrature current vectors and the rotor position of a PMSM is illustrated. Thus, according to FIG. 6, if quadrature vector M(8) or M(11) is applied just prior to applying measurement vector M(1), the measured inductance of vector M(1) will not be substantially affected by residual magnetic flux. In various implementations, the quadrature vector applied before the measured vector may be another measured vector or may be a dummy vector that is never used to collect current vector measurements (measured).

Figure 7:
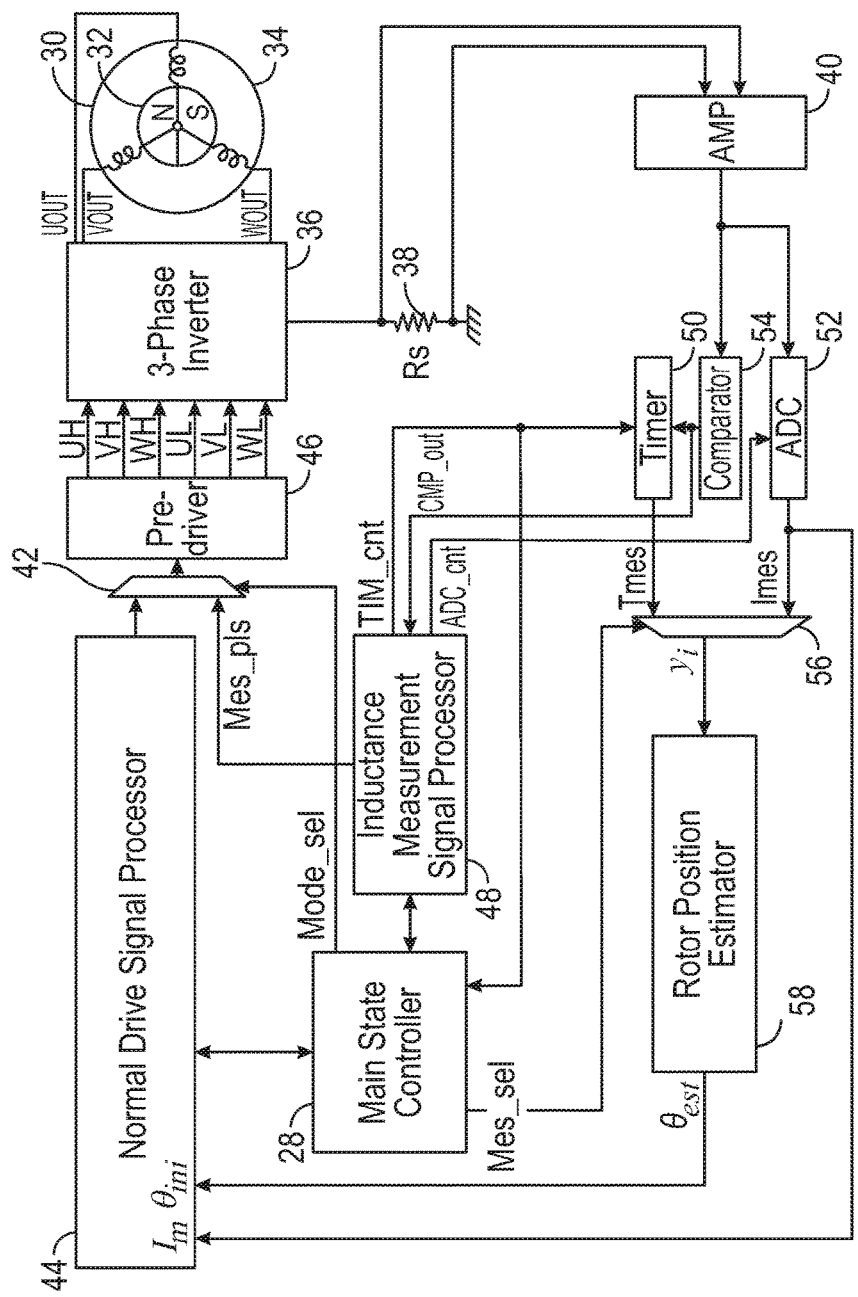
FIG. 7 is a block diagram representatively illustrating elements of a first implementation of a system for sensing rotor position of a motor.
Figure 8:
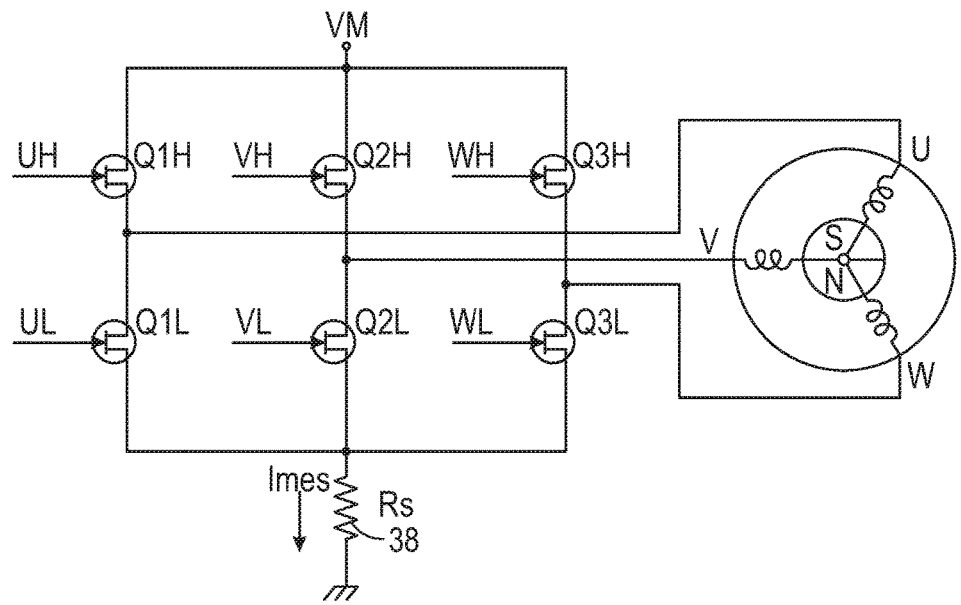
FIG. 8 is a diagram representatively illustrating elements of an implementation of a three-phase inverter and a shunt resistor coupled therewith.

Referring to FIG. 7, a block diagram representatively illustrating elements of a first implementation of a system for sensing rotor position of a motor is illustrated. In various implementations, a method for detecting the rotor position of a PMSM may include coupling a controller with a three phase PMSM 30 having a rotor 32 and a stator 34. The method may also include coupling a three-phase inverter 36 with the PMSM 30 that receives UH, VH, WH, UL, VL, and WL signals from a pre-driver. The three-phase inverter may, by non-limiting example, have the configuration shown of three-phase inverter of FIG. 8, where the UH signal controls switch Q1H, VH signal controls switch Q2H, WH signal controls switch Q3H, UL signal controls switch Q1L, VL signal controls switch Q2L, and WL signal controls switch Q3L to output three phase power to lines which are coupled with the PMSM. The method includes coupling a three-phase inverter with voltage VM and coupling a shunt resistor 38 (labeled Rs) as part of system.

The switches of three-phase inverter may be controlled, such as by the main-state controller controlling the normal drive signal processor and/or the inductance measurement signal processor, to accomplish applying a desired current vector to the PMSM. For example, if the uv current vector is needed, Q1H and Q2L may be turned on and all other switches turned off, so that the current shown as an Rs voltage corresponds to the uv current vector. The switches may be otherwise changed as desired to apply the wu, wv, uw, vw, and vu current vectors and measure the resulting currents as an Rs voltage from the PMSM.

Method implementations may include applying a plurality of current vectors using the controller to the PMSM, while in other method implementations, a plurality of voltage vectors may be applied to the PMSM instead. The plurality of current vectors may include both measured current vectors and dummy current vectors. In various implementations, the number of measured current vectors may be 6 vectors, 12 vectors, 24 vectors, or more than 24 vectors. In various implementations, each measured current vector may have a vector quadrature to the measured current vector applied to the PMSM 30 immediately prior to the measured current vector being applied. The quadrature vector may be another measured vector or may be a dummy vector. In various method implementations, at least one of the measured current vectors is applied quadrature to a dummy vector which immediately precedes the measured vector.

Referring back to FIG. 7, the method may include coupling two lines on either side of Rs to an amplifier (AMP) 40. A normal drive signal processor is used to control the pre-driver, but the method may include coupling a multiplexer 42 between the normal drive signal processor 44 and the pre-driver 46 so as to receive signals from the normal drive signal processor and from an inductance measurement signal processor 48. The multiplexer 42 is controlled by a controller 28 which also may communicate with the normal drive signal processor 44. Accordingly, in order to determine the position of the rotor of the PMSM, the controller 28 may alter the input of the pre-driver 46 using multiplexer 42 so that inputs from inductance measurement signal processor 48 are used to generate current vectors using the pre-driver 46.

The method may include measuring with a measurement circuit a plurality of values from the three phase inverter 36 coupled to the PMSM 30. The measurement circuit may include one or more elements coupled with one or more shunt resistors that are coupled with the three phase inverter. In various implementations, the measurement circuit may include a timer 50, an analog-to-digital converter (ADC) 52, or both a timer and an ADC. Each value may correspond with a measured current vector and may include either a current value corresponding with an inductance of the PMSM or a time value corresponding with an inductance of the PMSM. More specifically, each time a current vector is applied a signal will be received by AMP 40. In implementations this signal will be amplified by AMP 40 and passed on so that one signal will be passed to comparator 54 and another to the ADC 52. In other implementations the signal could be passed only to the comparator 54 or only to the ADC 52. The comparator 54 is communicatively/operably coupled with a timer 50 and the timer is communicatively coupled with multiplexer 56. The ADC 52 is communicatively coupled with multiplexer 56 and is also communicatively coupled with the normal drive signal processor 44.

The method also includes calculating, with one or more logic elements coupled to the PMSM, based on the plurality of values from the three phase inverter 36 and using one or more position algorithms, a position of a rotor of the PMSM relative to a stator of the PMSM. The one or more logic elements are included in the rotor position estimator 58 of FIG. 7. The rotor position estimator 58 is coupled with multiplexer 56 and with the normal drive signal processor 44 and is used to determine the rotor position. Either a time measurement (Tmes) method or a current measurement (Imes) method could be used to determine rotor position. If the Tmes method is used, then the timer is used in the process. For example, the signal processor 48 may cause the timer 50 to start when a current vector is initialized (or, in other implementations, may cause the timer to start when the current reaches a first level as communicated to the signal processor 48 from the comparator 54. When the current reaches an Ic level (some predetermined current level) as communicated from the comparator to the signal processor 48, then the timer 50 may be caused to stop by the signal processor 48 (though in other implementations one or more signals from the comparator to the timer may be used to directly start and/or stop the timer). In this way, the method includes measuring, in conjunction with each current vector, the time in which the current reaches a specified current level. This may be used to determine inductance of the PMSM, which may in turn be used, together with one or more algorithms, to determine rotor position.

Figure 10:
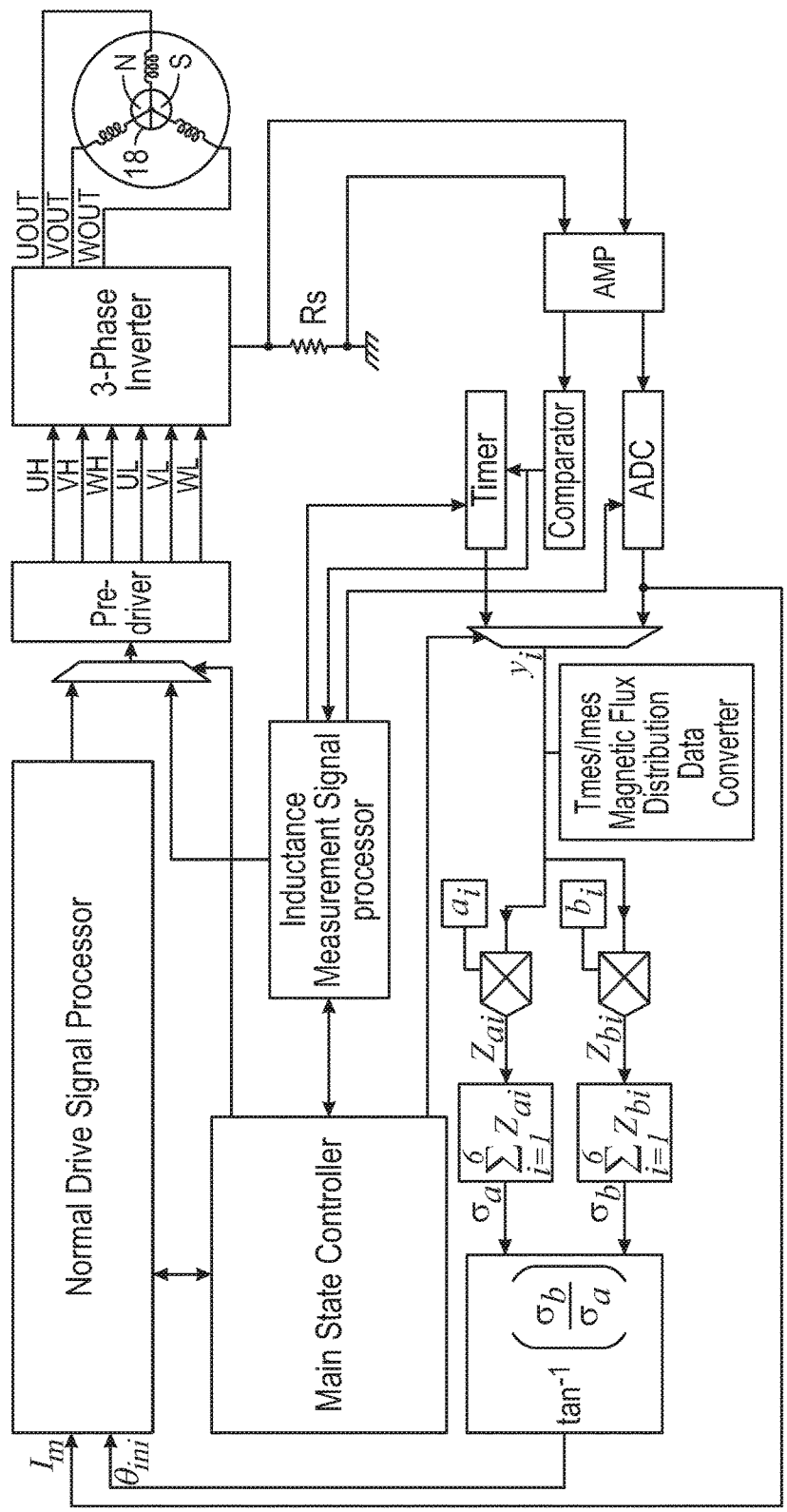
FIG. 10 is the diagram of FIG. 7 illustrating an arrangement of logic elements.

Referring to FIG. 10, the diagram of FIG. 7 illustrating an arrangement of logic elements is illustrated. The implementation illustrated by FIG. 10 is an example of an arrangement of logic elements that may be used to carry out the various calculations. In various implementations, the logic elements may be configured to calculate the position of the rotor when the rotor is in a stopped configuration, while in other implementations, the logic elements may be configured to calculate the position of the rotor when the rotor is in a rotating configuration. The logic elements may be configured to calculate a position of a rotor of a PMSM that is or is not controlled using vector control. U.S. patent application Ser. No. 15/215,425, the disclosure of which was previously incorporated herein by reference, discloses the specific operation of the logic elements that may be included in various system implementations disclosed herein.

The logic elements may use one or more position algorithms to calculate the position of a rotor. In various implementations, the position algorithms may be Eq. 5 or Eq. 6:

$$\tan^{-1}\left(\frac{\sum_{i=1}^{N}-\sin(2\alpha_i)y_i}{\sum_{i=1}^{N}-\cos(2\alpha_i)y_i}\right) \quad \text{Eq. 5}$$

$$\tan^{-1}\left(\frac{\sum_{i=1}^{N}\sin(2\alpha_i)y_i}{\sum_{i=1}^{N}\cos(2\alpha_i)y_i}\right) \quad \text{Eq. 6}$$

wherein each $\alpha_i$ includes a value between 0 and $2\pi$ and wherein each $y_i$ includes one of the measured values. U.S. patent application Ser. No. 15/215,425, the entirety of which was previously incorporated herein by reference, discloses the specific derivations of Eq. 5 and Eq. 6 that are used to create these position algorithms.

Figure 9:
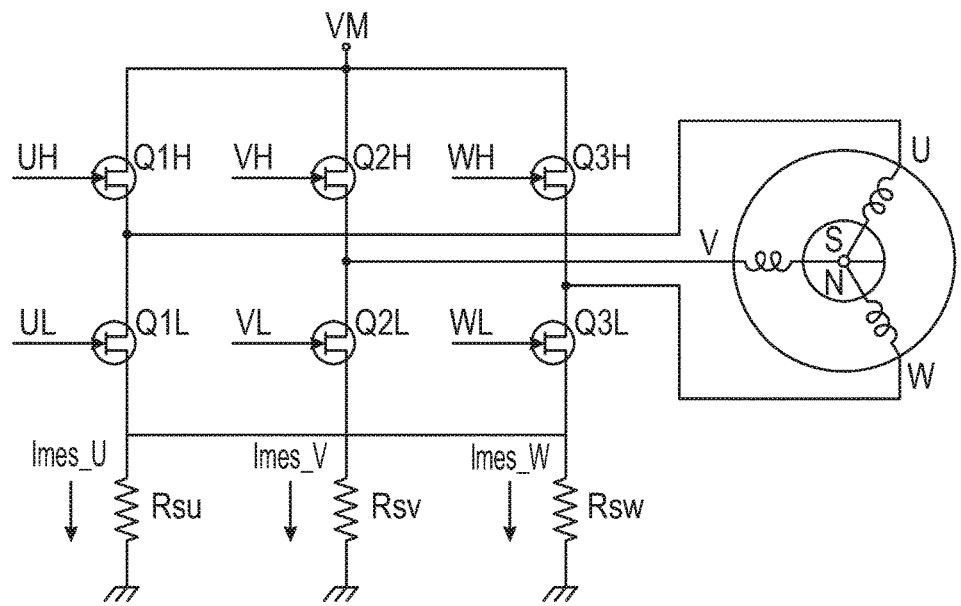
FIG. 9 is a diagram representatively illustrating elements of an implementation of a three-phase inverter and three shunt resistors coupled therewith.
Figure 11:
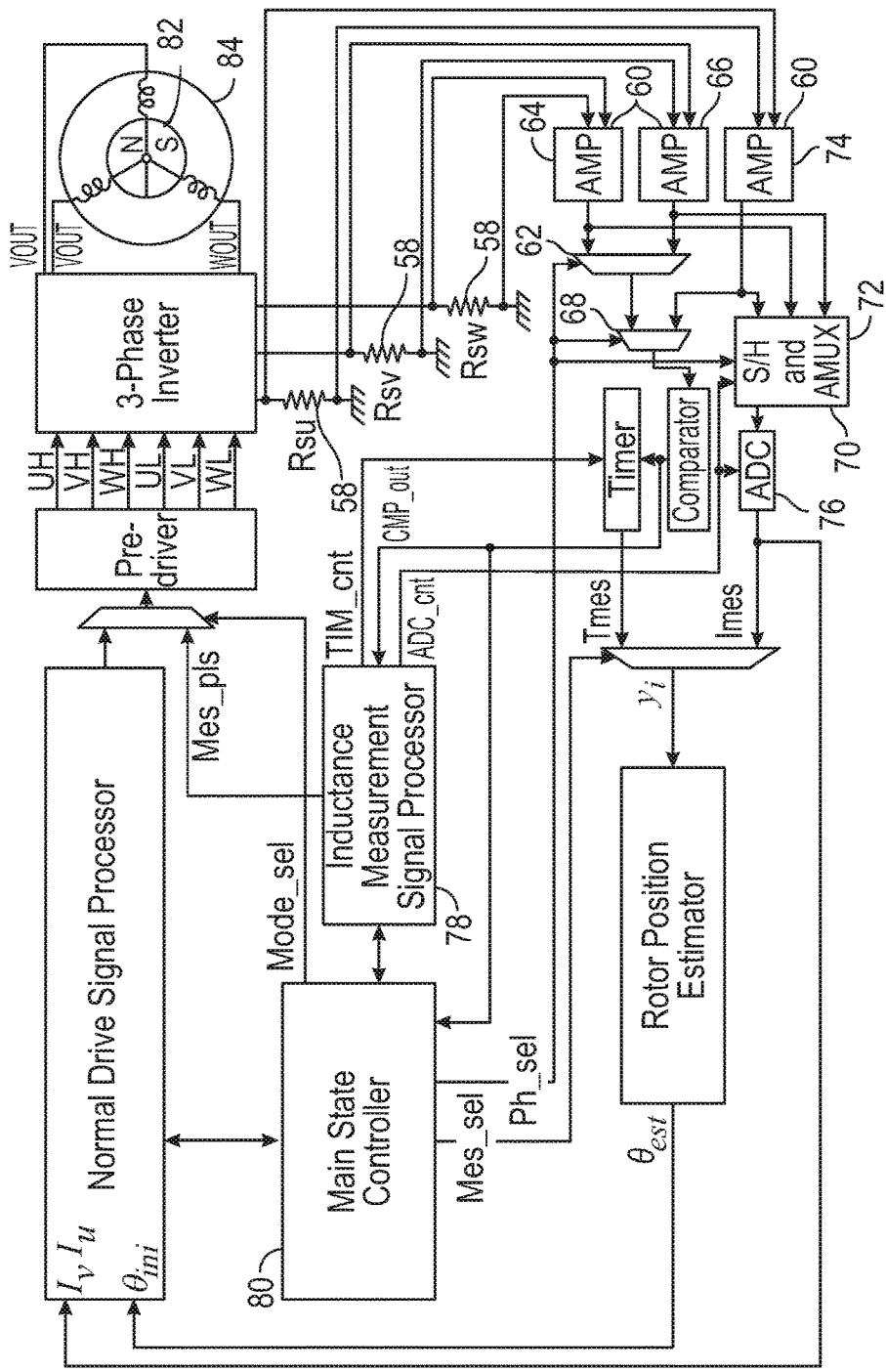
FIG. 11 is a block diagram representatively illustrating elements of a second implementation of a system for sensing rotor position of a motor.

Referring to FIG. 11, a block diagram representatively illustrating components of a second implementation of a system for sensing rotor position of a motor is illustrated. The system of FIG. 11, and the corresponding method of using the system of FIG. 11 to determine the rotor position of a three phase PMSM, is similar to the system of FIG. 7 and the associated method of FIG. 7. A difference is that rather than including a single shunt resistor Rs and a single AMP in the system, the method associated with FIG. 11 includes a plurality of shunt resistors 58 and a plurality of AMPs 60. In various implementations, the plurality of shunt resistors includes three resistors. This is further illustrated in FIG. 9, which is a diagram representatively illustrating elements of an implementation of a three-phase inverter and three shunt resistors coupled therewith. The method may include the AMPs receiving signals from the three-phase inverter. Multiplexer 62 receives signals from AMP 64 and AMP 66 and forwards one of these to multiplexer 68, while the outputs from AMPs 64 and 66 are also both communicated to stated hold element (S/H) 70/analog multiplexer (AMUX) 72. The output from AMP 74 is communicated to multiplexer 68 and also to S/H 70/AMUX 72. The output from S/H 70/AMUX 72 is forwarded to ADC 76. The CMP_out signal is forwarded to both the inductance measurement signal processor 78 and to the main state controller 80. The Ph_sel signal is used to control the S/H 70, AMUX 72, multiplexer 68 and multiplexer 62. The system of FIG. 11 is thus used for rotor position measurement or calculation of the rotor position of a PMSM.

Figure 12:
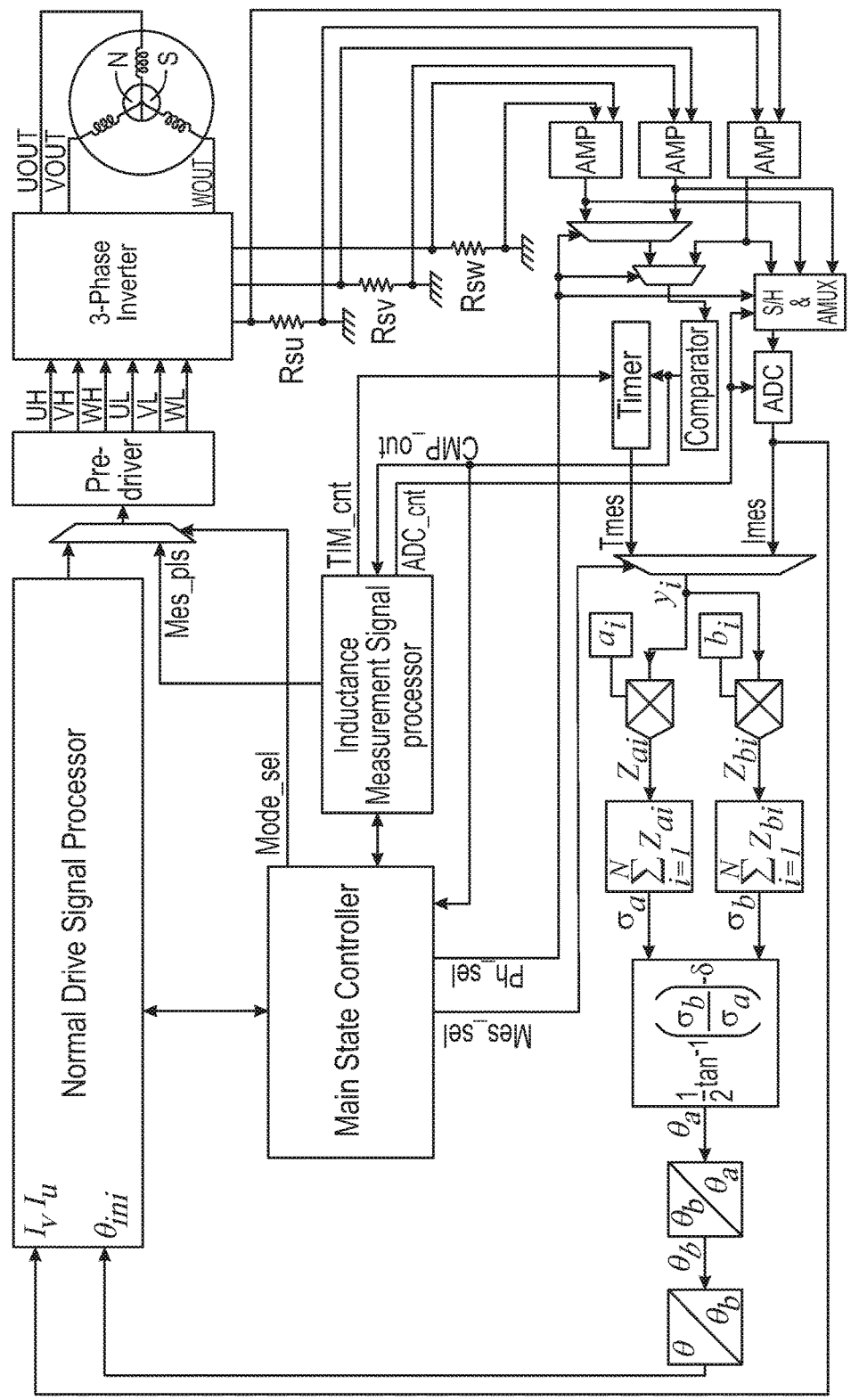
FIG. 12 is the diagram of FIG. 11 with a particular implementation of an arrangement of logic elements.

Referring to FIG. 12, the diagram of FIG. 11 with a particular implementation of an arrangement of logic elements is illustrated. U.S. patent application Ser. No. 15/215,425, the entirety of which was previously incorporated herein by reference, discloses the specific functions of each logic element that carry out the operation of the position algorithms along with further explanation on the function of the system depicted in FIG. 11. As with other systems and methods disclosed herein, the method associated with FIGS. 11 and 12 includes the logic elements using position algorithms to determine the position of the rotor of a PMSM. In various implementations, the position algorithms may be the algorithms of Eq. 5 or Eq. 6.

Figure 13:
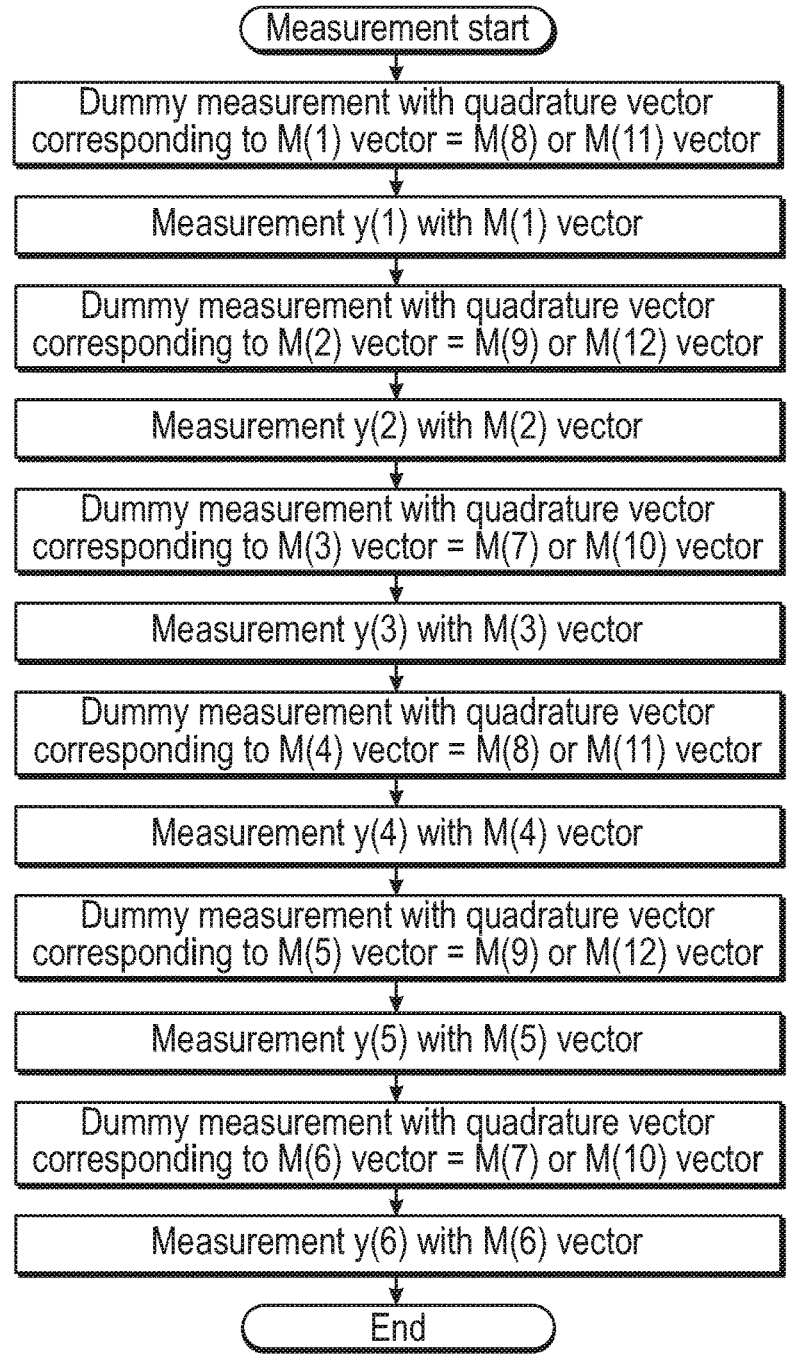
FIG. 13 is a process flow for applying current vectors and measuring values to determine the rotor position of a PMSM using six measured current vectors.

Referring to FIG. 13, a process flow for applying current vectors and measuring values to determine the rotor position of a PMSM using six measured current vectors is illustrated. The process illustrated in FIG. 13 may be used by the system depicted by FIG. 7, FIG. 11, or other system implementations. The current vectors in FIG. 13 correspond to the current vectors in FIG. 1, and the measurements depicted in FIG. 13 correspond to the data values depicted in FIG. 2. In various implementations, the M(8) or M(11) vector may be applied as a dummy vector quadrature to the M(1) vector. The M(1) vector may then be applied and the y(1) measurement corresponding with the M(1) vector may be taken. The M(9) or M(12) vector may then be applied as a dummy vector quadrature to the M(2) vector. The M(2) vector may then be applied and the y(2) measurement corresponding with the M(2) vector may be taken. The M(7) or M(10) vector may then be applied as a dummy vector quadrature to the M(3) vector. The M(3) vector may then be applied and the y(3) measurement corresponding with the M(3) vector may be taken. The M(8) or M(11) vector may then be applied as a dummy vector quadrature to the M(4) vector. The M(4) vector may then be applied and the y(4) measurement corresponding with the M(4) vector may be taken. The M(9) or M(12) vector may then be applied as a dummy vector quadrature to the M(5) vector. The M(5) vector may then be applied and the y(5) measurement corresponding with the M(5) vector may be taken. The M(7) or M(10) vector may then be applied as a dummy vector quadrature to the M(6) vector. The M(6) vector may then be applied and the y(6) measurement corresponding with the M(6) vector may be taken. In this implementation, six dummy vectors were used. In other implementations, however, there may be more or less than six dummy vectors used.

Figure 14:
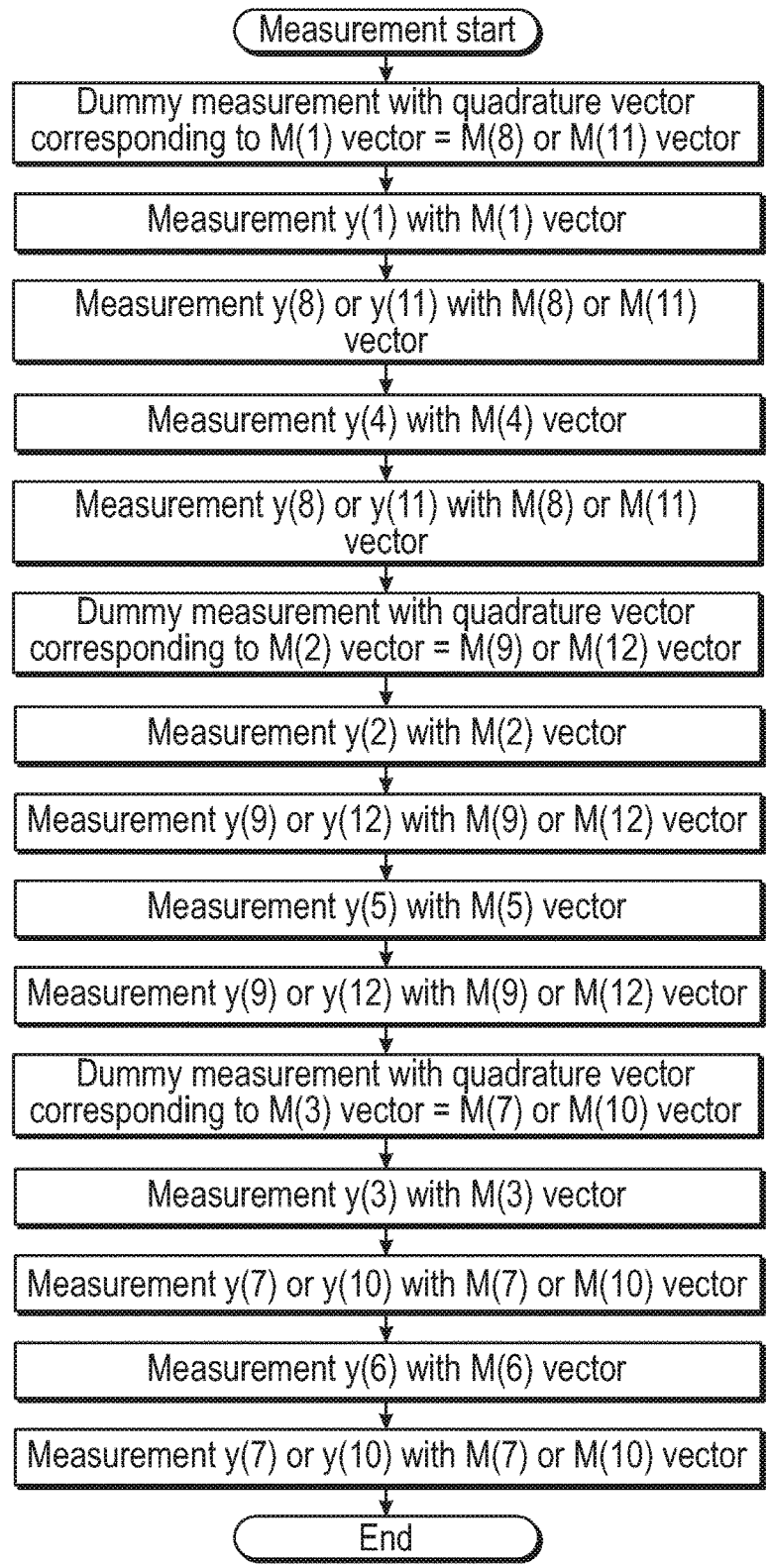
FIG. 14 is a process flow for applying current vectors and measuring values to determine the rotor position of a PMSM using twelve measured current vectors.

Referring to FIG. 14, a process flow for applying current vectors and measuring values to determine the rotor position of a PMSM using twelve measured current vectors is illustrated. Like FIG. 13, the process illustrated in FIG. 14 may be used by system implementations like those illustrated in FIG. 7, FIG. 11, or other system implementations. The current vectors in FIG. 14 correspond to the current vectors in FIG. 1, and the measurements depicted in FIG. 14 correspond to the data values depicted in FIG. 2. In various implementations, the M(8) or M(11) vector may be applied as a dummy vector quadrature to the M(1) vector. The M(1) vector may then be applied and the y(1) measurement corresponding with the M(1) vector may be taken. The M(8) or M(11) vector may then be applied and the y(8) or y(11) measurements corresponding to the M(8) or M(11) vector may be taken. There is no need to apply a dummy current preceding applying the M(8) or M(11) vectors because the measurement vector M(1) was already quadrature to M(8) or M(11). The M(4) vector may then be applied and the y(4) measurement corresponding to the M(4) vector may be taken. There is no need to apply a dummy current preceding applying the M(4) vector because the measurement vector M(8) or M(11) was already quadrature to M(4). The M(8) or M(11) vector may then be applied (depending on which vector was applied earlier) and the y(8) or y(11) measurements corresponding to the M(8) or M(11) vector may be taken. There is no need to apply a dummy current preceding applying the M(8) or M(11) vectors because the measurement vector M(4) was already quadrature to M(8) or M(11). The M(9) or M(12) vector may then be applied as a dummy vector quadrature to the M(2) vector. The M(2) vector may then be applied and the y(2) measurement corresponding with the M(2) vector may be taken. The M(9) or M(12) vector may then be applied and the y(9) or y(12) measurements corresponding to the M(9) or M(12) vector may be taken. There is no need to apply a dummy current preceding applying the M(9) or M(12) vectors because the measurement vector M(2) was already quadrature to M(9) or M(12). The M(5) vector may then be applied and the y(5) measurement corresponding to the M(5) vector may be taken. There is no need to apply a dummy current preceding applying the M(5) vector because the measurement vector M(9) or M(12) was already quadrature to M(5). The M(9) or M(12) vector may then be applied (depending on which vector was applied earlier) and the y(9) or y(12) measurements corresponding to the M(9) or M(12) vector may be taken. There is no need to apply a dummy current preceding applying the M(9) or M(12) vectors because the measurement vector M(5) was already quadrature to M(9) or M(12). The M(7) or M(10) vector may then be applied as a dummy vector quadrature to the M(3) vector. The M(3) vector may then be applied and the y(3) measurement corresponding with the M(3) vector may be taken. The M(7) or M(10) vector may then be applied and the y(7) or y(10) measurements corresponding to the M(7) or M(10) vector may be taken. There is no need to apply a dummy current preceding applying the M(7) or M(10) vectors because the measurement vector M(3) was already quadrature to M(7) or M(10). The M(6) vector may then be applied and the y(6) measurement corresponding to the M(6) vector may be taken. There is no need to apply a dummy current preceding applying the M(6) vector because the measurement vector M(7) or M(10) was already quadrature to M(6). The M(7) or M(10) vector may then be applied (depending on which vector was applied earlier) and the y(7) or y(10) measurements corresponding to the M(7) or M(10) vector may be taken. There is no need to apply a dummy current preceding applying the M(7) or M(10) vectors because the measurement vector M(6) was already quadrature to M(7) or M(10). In this implementation, only three dummy vectors were used. In other implementations, more or less than three dummy vectors may be used. Further, in other implementations, the order in which specific current vectors may be applied to the PMSM may vary from what is disclosed in FIG. 13 and FIG. 14 while still following the principle that every measured current vector has a current vector quadrature to the measured current vector applied to the PMSM immediately before each measured current vector.

Figure 15:
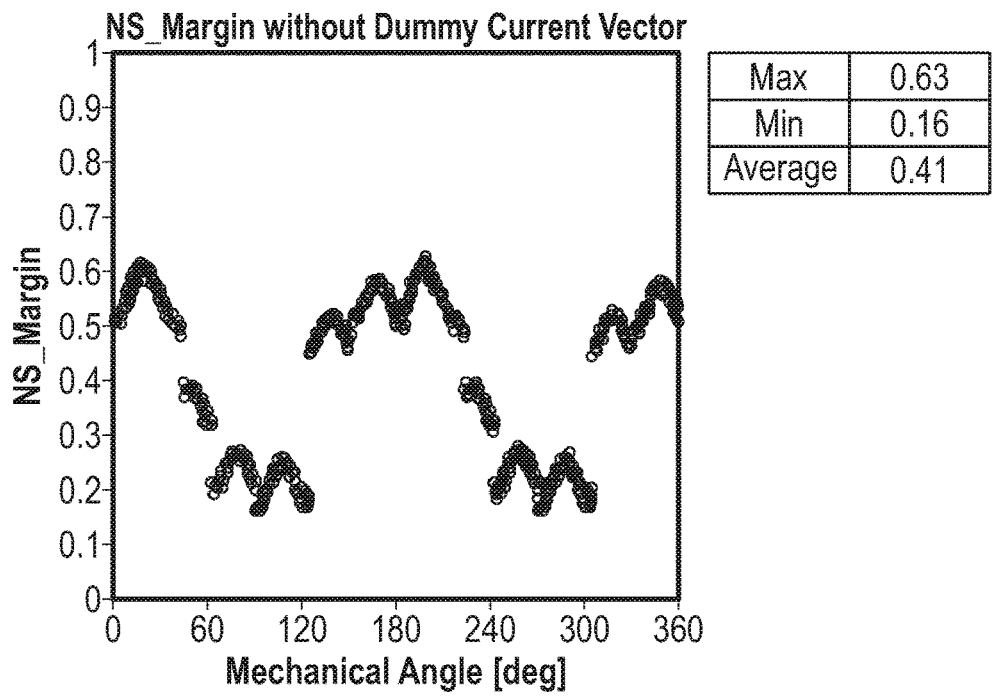
FIG. 15 is a chart showing the NS_Margin, shown in Eq. 1, associated with a conventional method for determining the rotor position of a PMSM.

Referring to FIG. 15, a chart showing the NS_Margin, shown in Eq. 1, associated with a method for determining the rotor position of a PMSM without using dummy vectors is shown. As indicated by the key associated with FIG. 15, the margin between the measurements indicating the north and south pole of the rotor when no dummy current vectors (or other quadrature measurement vectors) are applied is 0.16. Due to this small margin, the likelihood of mistaking the actual rotor position by 180 degrees is high.

Figure 16:
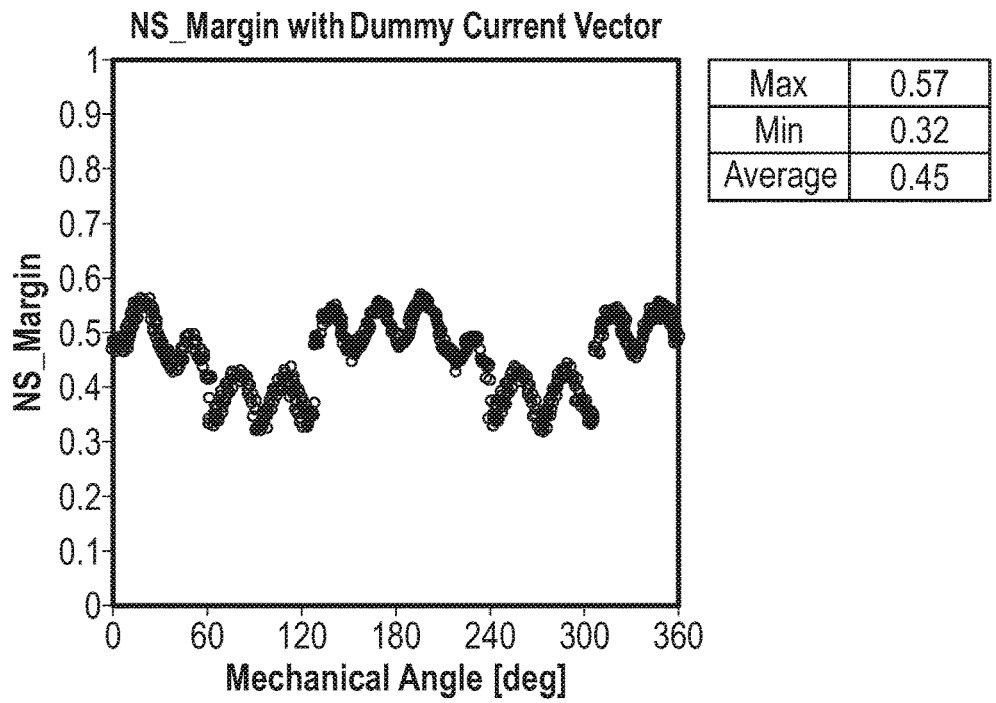
FIG. 16 is a chart showing the NS_Margin, shown in Eq. 1, associated with the current method for determining the rotor position of a PMSM.

In contrast to this, FIG. 16 is a chart showing the NS_Margin, shown in Eq. 1, associated with the method for determining the rotor position of a PMSM using dummy vectors is shown. As indicated by the key associated with FIG. 16, the margin between the measurements indicating the north and the south pole of the rotor when dummy current vectors (or other quadrature measurement vectors) are applied is 0.32, twice the amount of the minimum margin of FIG. 15. Due to the increase in margin, the likelihood of mistaking the rotor position by 180 degrees is significantly decreased.

Figure 17:
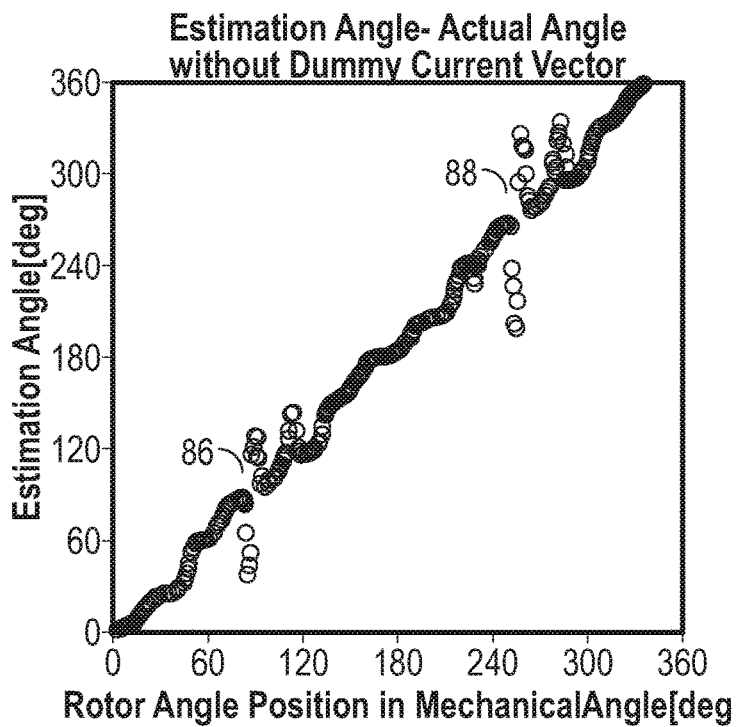
FIG. 17 is a chart illustrating the relation between the estimated position and the actual position of a PMSM without using a method with dummy current vectors.
Figure 18:
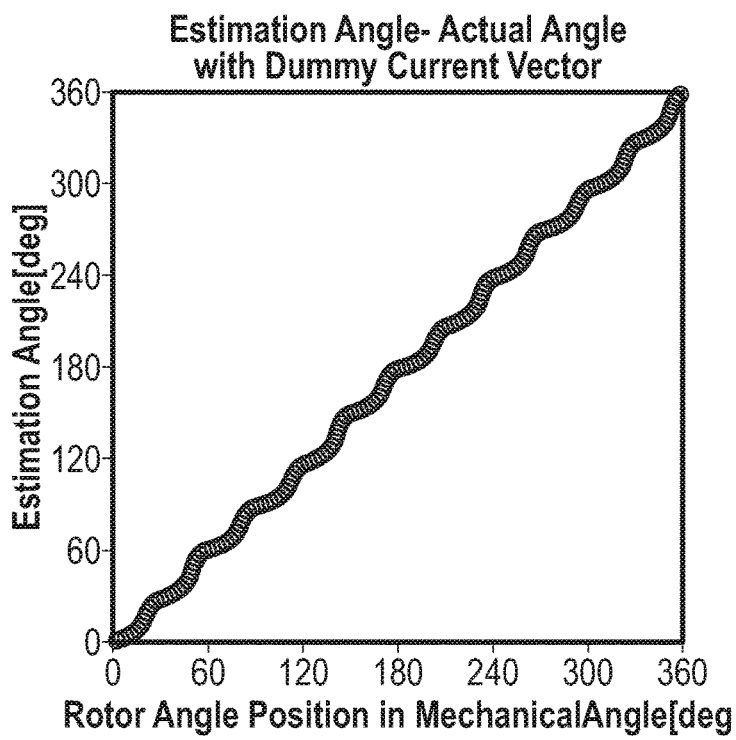
FIG. 18 is a chart illustrating the relation between the estimated position and the actual position of a PMSM using a method with dummy current vectors.

This difference is further illustrated in FIGS. 17 and 18. Referring to FIG. 17, a chart illustrating the relation between the estimated position and the actual position of a rotor of a PMSM without using a method with dummy current vectors is shown. A first area of error 86 arises when trying to distinguish between the current vectors corresponding to the north pole and the south pole of the rotor. Similarly, 180 degrees from the first area of error 86, a second area of error 88 arises when trying to distinguish between the current vectors corresponding to the north pole and the south pole of the rotor. As seen in FIG. 17, a high error rate exists when distinguishing between the current vectors corresponding to the north pole and the south pole of the rotor as these vectors have a minimum difference in inductance due to the effects of the residual magnetic flux.

Contrary to this, FIG. 18, which shows a chart illustrating the relation between the estimated position and the actual position of a PMSM using a method with dummy current vectors, does not have any error areas. This is because the minimum inductance margin difference between the current vectors corresponding to the north pole and the south pole of the rotor is greater due to the elimination of the effects of the residual magnetic flux.

In places where the description above refers to particular implementations of systems for detecting rotor position of a PMSM and implementing components, sub-components, methods and sub-methods, it should be readily apparent that a number of modifications may be made without departing from the spirit thereof and that these implementations, implementing components, sub-components, methods and sub-methods may be applied to other systems and methods for detecting rotor position of a PMSM.

What is claimed is:

1. A method for sensing rotor position of a motor, the method comprising:
    coupling a controller with a three phase permanent magnet synchronous motor (PMSM);
    applying, using the controller, a plurality of current vectors to the PMSM, the plurality of current vectors comprising a plurality of dummy current vectors and a plurality of measured current vectors, wherein at least one measured current vector is applied quadrature to a dummy current vector from the plurality of dummy current vectors immediately preceding each measured current vector;
    measuring, with a measurement circuit, a plurality of values from a three-phase inverter coupled with the PMSM, each value of the plurality of values corresponding with one of the plurality of measured current vectors, and;
    calculating, with one or more logic elements coupled with the PMSM, based on the plurality of values and using one or more position algorithms, a position of a rotor of the PMSM relative to a stator of the PMSM.

2. The method of claim 1, wherein the PMSM is one of a star configuration PMSM and a delta configuration PMSM.

3. The method of claim 1, wherein the PMSM comprises one of a surface permanent magnet synchronous motor (SPMSM) and an interior permanent magnet synchronous motor (IPMSM).

4. The method claim 1, wherein the plurality of measured current vectors comprise six different current vectors.

5. The method of claim 4, wherein the plurality of dummy current vectors comprise six dummy vectors.

6. The method of claim 1, wherein the plurality of measured current vectors comprise twelve different current vectors.

7. The method of claim 6, wherein the plurality of dummy current vectors comprise three dummy vectors.

8. The method of claim 1, wherein the one or more position algorithms includes one of $$\tan^{-1}\left(\frac{\sum_{i=1}^{N} -\sin(2\alpha_i)y_i}{\sum_{i=1}^{N} -\cos(2\alpha_i)y_i}\right)$$

and $$\tan^{-1}\left(\frac{\sum_{i=1}^{N} \sin(2\alpha_i)y_i}{\sum_{i=1}^{N} \cos(2\alpha_i)y_i}\right)$$

wherein each $\alpha_i$ includes a value between 0 and $2\pi$ and wherein each $y_i$ includes one of the measured values.

9. A method for sensing rotor position of a motor, the method comprising:
coupling a controller and one of a timer and an analog-to-digital converter (ADC) with a three phase permanent magnet synchronous motor (PMSM);
applying, using the controller, a plurality of current vectors to the PMSM, the plurality of current vectors comprising a plurality of dummy current vectors and a plurality of measured current vectors, wherein at least one measured current vector is applied quadrature to a dummy current vector from the plurality of dummy current vectors immediately preceding each measured current vector;
measuring, with the one of the timer and the ADC, a plurality of values from a three-phase inverter coupled with the PMSM, each value of the plurality of values corresponding with one of the plurality of measured current vectors and comprising one of a current value corresponding with an inductance of the PMSM and a time value corresponding with an inductance of the PMSM, and;
calculating, with one or more logic elements coupled with the PMSM, based on the plurality of values and using one or more position algorithms, a position of a rotor of the PMSM relative to a stator of the PMSM;
wherein the one or more logic elements are configured to calculate the position of the rotor when the rotor is in a stopped configuration and when the rotor is in a rotating configuration, and;
wherein the one or more logic elements are configured to calculate a position of a rotor of a PMSM that is not controlled using vector control.

10. The method of claim 9, wherein the one or more position algorithms includes one of $$\tan^{-1}\left(\frac{\sum_{i=1}^{N} -\sin(2\alpha_i)y_i}{\sum_{i=1}^{N} -\cos(2\alpha_i)y_i}\right)$$

and $$\tan^{-1}\left(\frac{\sum_{i=1}^{N} \sin(2\alpha_i)y_i}{\sum_{i=1}^{N} \cos(2\alpha_i)y_i}\right)$$

wherein each $\alpha_i$ includes a value between 0 and $2\pi$ and wherein each $y_i$ includes one of the measured values.

11. The method of claim 9, wherein the plurality of values are measured using one or more elements coupled with one or more shunt resistors that are coupled with the three-phase inverter.

12. The method of claim 9, further comprising coupling the timer with the PMSM and toggling the timer between a start configuration and a stop configuration using a signal processor in response to an input from a comparator.

13. The method of claim 9, further comprising coupling the ADC with the PMSM, converting an analog signal from the three-phase inverter to a digital signal using the ADC, and communicating the digital signal from the ADC to the one or more logic elements.

14. The method of claim 9, wherein the plurality of dummy vectors comprise one of six dummy vectors and three dummy vectors.

15. A method for sensing rotor position of a motor, the method comprising:
coupling a controller with a three phase permanent magnet synchronous motor (PMSM);
applying, using the controller, a plurality of current vectors to the PMSM, the plurality of current vectors comprising at least three dummy current vectors and at least six measured current vectors, wherein each dummy current vector is applied quadrature to a measured current vector immediately before each measured current vector is applied;
measuring, with a measurement circuit, a plurality of values from a three-phase inverter coupled with the PMSM, each value of the plurality of values corresponding with one of the plurality of measured current vectors, and;
calculating, with one or more logic elements coupled with the PMSM, based on the plurality of values and using one or more position algorithms, a position of a rotor of the PMSM relative to a stator of the PMSM.

16. The method of claim 15, further comprising coupling one or more shunt resistors with the logic elements and the three-phase inverter.

17. The method of claim 15, wherein the one or more logic elements are configured to calculate a position of a rotor of a PMSM that is controlled using vector control.

18. The method of claim 15, wherein the one or more position algorithms includes one of $$\tan^{-1}\left(\frac{\sum_{i=1}^{N} -\sin(2\alpha_i)y_i}{\sum_{i=1}^{N} -\cos(2\alpha_i)y_i}\right)$$

and $$\tan^{-1}\left(\frac{\sum_{i=1}^{N}\sin(2\alpha_i)y_i}{\sum_{i=1}^{N}\cos(2\alpha_i)y_i}\right)$$

wherein each $\alpha_i$ includes a value between 0 and $2\pi$ and wherein each $y_i$ includes one of the measured values.

19. The method of claim 15, wherein the PMSM comprises one of a SPMSM and an IPMSM.

20. The method of claim 15, wherein the plurality of dummy vectors comprise one of six dummy vectors and three dummy vectors.

* * * * *